(No Model.)
E. H. PHIPPS.
UNDERGROUND ELECTRIC CONDUIT.
No. 407,447. Patented July 23, 1889.
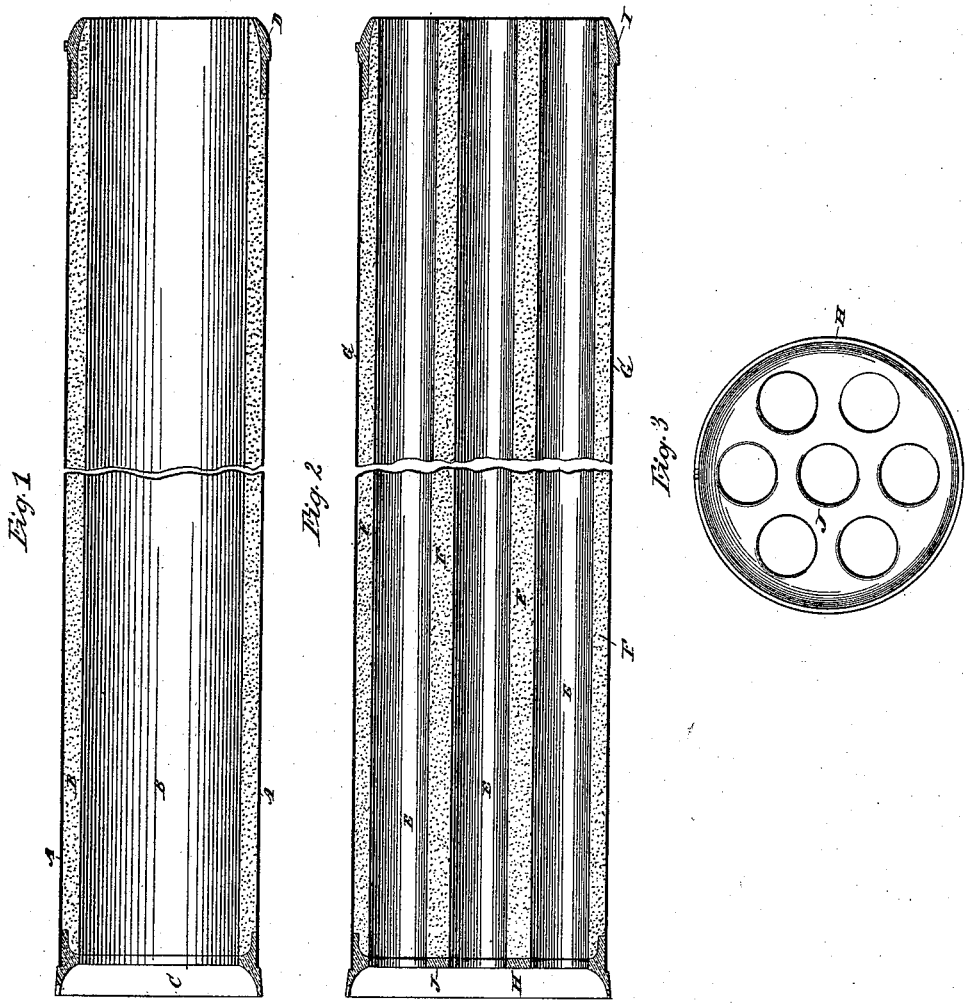
Witnesses:
Chas B Shumway
M J deMauriac
Inventor
Edward H. Phipps.
By Geo. D. Seymour
Atty.

UNITED STATES PATENT OFFICE.

EDWARD H. PHIPPS, OF NEW HAVEN, CONNECTICUT.

UNDERGROUND ELECTRIC CONDUIT.

SPECIFICATION forming part of Letters Patent No. 407,447, dated July 23, 1889.

Application filed June 17, 1889. Serial No. 314,559. (No model.)

*To all whom it may concern:*

Be it known that I, EDWARD H. PHIPPS, residing at New Haven, in the county of New Haven and State of Connecticut, have invented certain new and useful Improvements in Underground Electric Conduits; and I do declare the following to be a full, clear, and exact description of the same, reference being had to the accompanying drawings, which form a part of this specification.

Heretofore underground electric conduits have been lined with hydraulic cement and have been found objectionable, because the same requires considerable moisture for its best preservation and will crack in the absence of it, and therefore antagonizes the requirement that to be most efficient an electric conduit must be kept perfectly dry.

The object of my invention is to avoid the objection above noted and to produce a cheap, durable, tough, smooth, and efficient conduit.

With these ends in view my invention consists in a conduit having certain details of construction and combinations of parts, as will be hereinafter described, and pointed out in the claim.

In the accompanying drawings, Figure 1 is a view in vertical longitudinal section of a conduit-section embodying my invention. Fig. 2 is a similar view of another form which my improved conduit-section may assume; and Fig. 3 is a detached view showing the diaphragmed glass ring, forming a part of the conduit-section shown by Fig. 2.

The conduit-section shown by Fig. 1 of the drawings consists of a thin metal shell A, a lining B therefor, and glass rings C and D, respectively, located in the opposite ends of the shell and adapted to form the opposite members of a universal joint, the said rings being made of very tough or annealed glass. The said lining B is made by combining thirty parts of hydraulic cement with fifty parts of silicon or sand, five parts of silicate of sodium, and fifteen parts of anhydrous calcium sulphate. The composition formed by compounding the said ingredients is tougher, harder, and smoother than hydraulic cement, is a better insulator than the same, and will not crack, however dry. The conduit-sections are made yet smoother in finish by washing them over with a bath of silicate of sodium, which is readily soluble in water.

The conduit-section shown by Fig. 2 of the drawings is multitubular, having several separate passages E formed in a filling F, made of the composition described above and inclosed in a metal shell G. This conduit-section has two glass rings H and I, corresponding to the rings before referred to, except that one of them has a diaphragm J formed within it and between its ends and perforated to correspond to the passages E. By making the rings of glass, instead of iron, a better insulation is secured. If desired, the anhydrous calcium sulphate may be replaced by the same amount of calcium hydrate. The proportions herein given may of course be somewhat varied. It is not necessary that the conduit-sections be circular in cross-section. If desired, they may be rectangular or of any other suitable shape to which the rings will of course be conformed.

Having fully described my invention, what I claim as new, and desire to secure by Letters Patent, is—

A conduit-section consisting of a metal shell and a lining composed of hydraulic cement, silicon, silicate of sodium, and anhydrous calcium sulphate or its equivalent, combined in substantially the proportions set forth.

In testimony whereof I have signed this specification in the presence of two subscribing witnesses.

EDW. H. PHIPPS.

Witnesses:
CHAS. B. SHUMWAY,
WM. Y. DE MAURIAC.